US009534640B2

(12) United States Patent
Bouton et al.

(10) Patent No.: US 9,534,640 B2
(45) Date of Patent: Jan. 3, 2017

(54) CLUTCH COUPLED TO GAS TURBINE ENGINE AND METHOD FOR COOLING

(71) Applicant: Rolls-Royce Corporation, Indianapolis, IN (US)

(72) Inventors: Matthew T. Bouton, Indianapolis, IN (US); Doug M. Schwerin, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 317 days.

(21) Appl. No.: 14/142,737

(22) Filed: Dec. 27, 2013

(65) Prior Publication Data
US 2015/0041274 A1 Feb. 12, 2015

Related U.S. Application Data

(60) Provisional application No. 61/774,186, filed on Mar. 7, 2013.

(51) Int. Cl.
*F16D 13/72* (2006.01)
*F02C 7/36* (2006.01)
*F16D 13/52* (2006.01)

(52) U.S. Cl.
CPC ............. *F16D 13/72* (2013.01); *F02C 7/36* (2013.01); *F16D 13/52* (2013.01); *F05D 2240/61* (2013.01); *F05D 2260/20* (2013.01); *F05D 2260/4023* (2013.01); *Y02T 50/675* (2013.01)

(58) Field of Classification Search
CPC ............ F16D 2300/0212; F16D 2300/0214; F16D 25/123; F16D 2260/4023; F16D 2240/61; F16D 2260/98
See application file for complete search history.

(56) References Cited

U.S. PATENT DOCUMENTS

| 3,452,848 | A |   | 7/1969  | Brunner        |           |
|-----------|---|---|---------|----------------|-----------|
| 3,605,963 | A |   | 9/1971  | Lyth et al.    |           |
| 3,819,020 | A | * | 6/1974  | Smith          | F16D 13/74 |
|           |   |   |         |                | 192/103 FA |
| 3,841,455 | A |   | 10/1974 | Eastwood       |           |
| 4,082,011 | A |   | 4/1978  | McQuinn et al. |           |
| 4,265,334 | A |   | 5/1981  | Benhase, Jr.   |           |

(Continued)

FOREIGN PATENT DOCUMENTS

GB          711788 A        7/1954

OTHER PUBLICATIONS

International Search Report and Written Opinion, International Application No. PCT/US2013/078137, Oct. 16, 2014, 9 pages.

*Primary Examiner* — Robert Hodge
*Assistant Examiner* — Ryan Dodd
(74) *Attorney, Agent, or Firm* — Barnes & Thornburg LLP

(57) ABSTRACT

A gas turbine engine clutch includes a dry clutch assembly, forward and aft working areas, and a shaft. The dry clutch assembly is operative to receive power from a gas turbine engine. The dry clutch assembly is configured to selectively engage the gas turbine engine with a driven source, and has an axial opening extending therethrough. The forward and aft working areas are disposed at axially opposite ends of the dry clutch assembly. The shaft extends axially through the axial opening of the dry clutch assembly, and defines an axial fluid flow passage therethrough in liquid fluid communication with the forward and aft working areas.

12 Claims, 3 Drawing Sheets

(56) References Cited

U.S. PATENT DOCUMENTS

| | | | |
|---|---|---|---|
| 4,341,296 | A | 7/1982 | Schaefer et al. |
| 4,574,926 | A | 3/1986 | Bubak |
| 4,827,784 | A | 5/1989 | Muller et al. |
| 5,511,436 | A | 4/1996 | Hasegawa et al. |
| 6,464,059 | B1 | 10/2002 | Kundermann et al. |
| 7,934,997 | B2 | 5/2011 | Avins et al. |
| 2006/0006042 | A1 | 1/2006 | Koenig |
| 2009/0205924 | A1 | 8/2009 | Agner et al. |
| 2009/0320491 | A1 | 12/2009 | Copeland |
| 2010/0044178 | A1* | 2/2010 | Wheals et al. ............... 192/48.8 |
| 2010/0113216 | A1 | 5/2010 | Avny et al. |
| 2011/0024258 | A1 | 2/2011 | Avny et al. |
| 2013/0199156 | A1* | 8/2013 | Ress et al. ............... 60/224 |

* cited by examiner

CLUTCH COUPLED TO GAS TURBINE ENGINE AND METHOD FOR COOLING

CROSS REFERENCE TO RELATED APPLICATIONS

This application claims priority to and the benefit of U.S. Provisional Patent Application No. 61/774,186, filed 7 Mar. 2013, the disclosure of which is now expressly incorporated herein by reference.

STATEMENT REGARDING FEDERALLY SPONSORED RESEARCH OR DEVELOPMENT

Embodiments of the present disclosure were made with government support under Contract No. N00019-02-C-3003. The government may have certain rights.

TECHNICAL FIELD

The present disclosure relates to methods and apparatuses for cooling a clutch. More particularly, but not exclusively, the present application relates to methods and apparatuses for cooling a clutch coupled to a gas turbine engine using a working fluid.

BACKGROUND

Providing cooling to clutches that transmit power, for example from a gas turbine engine to a driven component of an aircraft, remains an area of interest. Some existing systems have various shortcomings, drawbacks, and disadvantages relative to certain applications. Accordingly, there remains a need for further contributions in this area of technology.

SUMMARY

One embodiment of the present application is a dry clutch assembly that has a shaft extending through an axial opening of the dry clutch assembly, and which defines a fluid flow passage through which a working fluid can be routed that serves to cool the dry clutch assembly. Other embodiments include unique methods, systems, devices, and apparatus to provide for cooling the dry clutch assembly. Further embodiments, forms, objects, aspects, benefits, features, and advantages of the present application shall become apparent from the description and figures provided herewith.

BRIEF DESCRIPTION OF THE FIGURES

Features of the application will be better understood from the following detailed description when considered in reference to the accompanying drawings, in which.

DETAILED DESCRIPTION OF REPRESENTATIVE EMBODIMENTS

Figure 1:
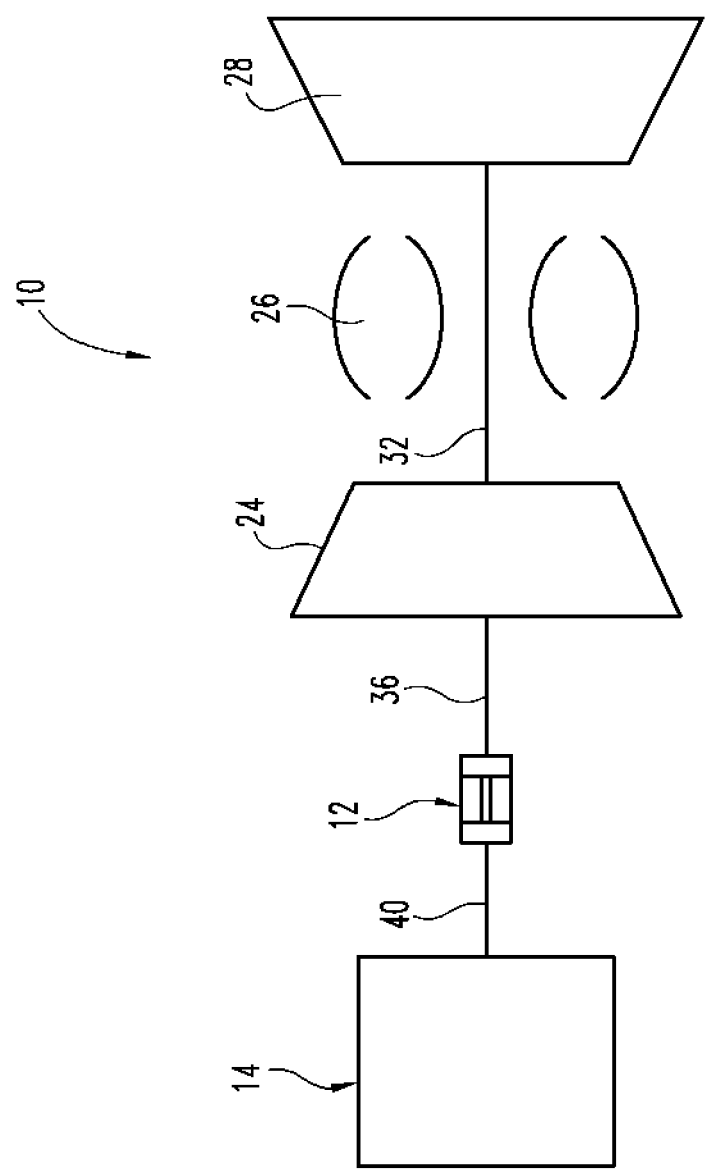
FIG. 1 shows a gas turbine engine coupled to a clutch and driven aircraft component according to an embodiment.

While the present invention can take many different forms, for the purpose of promoting an understanding of the principles of the invention, reference will now be made to the embodiments illustrated in the drawing and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

With reference to FIG. 1, there is illustrated a schematic representation of one form of an aircraft gas turbine engine 10, a clutch 12, and a driven component 14 of the aircraft, according to an embodiment. The clutch 12 can take on any suitable forms for any given application, and in one form, the clutch 12 comprises a multi-disk dry clutch.

The clutch 12 transmits power from the gas turbine engine 10 to the driven component 14 when the clutch 12 is engaged. When the clutch 12 is disengaged, power transmission is terminated and the gas turbine engine 10 no longer provides power to the driven component 14. In one embodiment, heat generated by the clutch 12, during engagement and/or disengagement, can be absorbed by a working fluid that is routed axially through the clutch 12, as will be described in greater detail below.

The as-shown clutch 12 couples an aircraft gas turbine engine 10 as a driving component to an aircraft component 14 as a driven component. The clutch 12 is not limited to such configuration, and other embodiments are contemplated. For example, the clutch 12 can be utilized in industrial applications, power generation applications, pumping sets, naval propulsion and other applications known to one of ordinary skill in the art. Further, it will be appreciated that the term "aircraft" as used herein includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles.

The gas turbine engine 10 includes, in the fwd-to-aft direction, a compressor section 24, a combustion section 26, and a turbine section 28, which together form an aircraft power plant. As used herein, the terms fwd, forward, and upstream, indicate the left side of FIGS. 1 and 2, and the terms aft, rearward, and downstream, indicate the right side of FIGS. 1 and 2. Such relational terms as may be used in the description of any of the figures herein are intended to provide ease of reference in light of the provided figures and are not intended to be limiting to any given installation, orientation, etc. of any embodiment of a gas turbine engine 10, clutch 12, etc.

Airflow enters the gas turbine engine 10 and is compressed by the compressor section 24 before entering the combustion section 26 where it is mixed with fuel and burned before being expanded by the turbine section 28. A rotating shaft 32 connects the turbine section 28 to the compressor section 24 and serves to transfer power between the two. As will be appreciated, the gas turbine engine 10 can take a variety of forms such as, but not limited to, a turbofan, turbojet, turboshaft, and turboprop. Further, although the illustrated gas turbine engine 10 comprises a single spool engine, in another form the gas turbine engine 10 may comprise a multi-spool engine. In other embodiments, the gas turbine engine 10 may have other configurations suited to the particular application of the aircraft. For example, the gas turbine engine 10 can comprise a high bypass ratio (BPR) engine, an engine having a low pressure (LP) spool, among others.

A driveshaft 36 located upstream of the compressor section 24 (to the left in FIG. 1) is coupled to the rotating shaft 32 of the gas turbine engine 10 to draw rotational power from the gas turbine engine 10. The driveshaft 36 transfers rotational power to the clutch 12, which, in turn, can engage a shaft 40 of the driven component 14 to transmit power to the driven component 14. In the FIG. 1 embodiment, the driveshaft 36 is shown coupled to the upstream end of the rotating shaft 32; other configurations are also contemplated. In one form, the driveshaft 36 can take power from the rotating shaft 32 via a power take-off system in which for example the rotating shaft 32 takes power via a suitable bevel gear assembly at a location along the rotating shaft 32 in the combustion section 26, where the driveshaft 36 may be positioned transverse to the rotating shaft 32, for example.

The driven component 14 can be a generator, a fan, a gear assembly or series of gear assemblies, another clutch or series of clutches, or any other device or component that can utilize rotational power provided by the gas turbine engine 10 through the clutch 12. In one non-limiting embodiment, the driven component 14 comprises a lift fan 14 of a short take off/vertical landing (STOVL) aircraft. Thus, for example, the clutch 12 can be used to selectively engage the shaft 40 of the lift fan 14 to the driveshaft 36 coupled to the aircraft gas turbine engine 10 to permit generation of lift from the lift fan 14 as desired.

Figure 2:
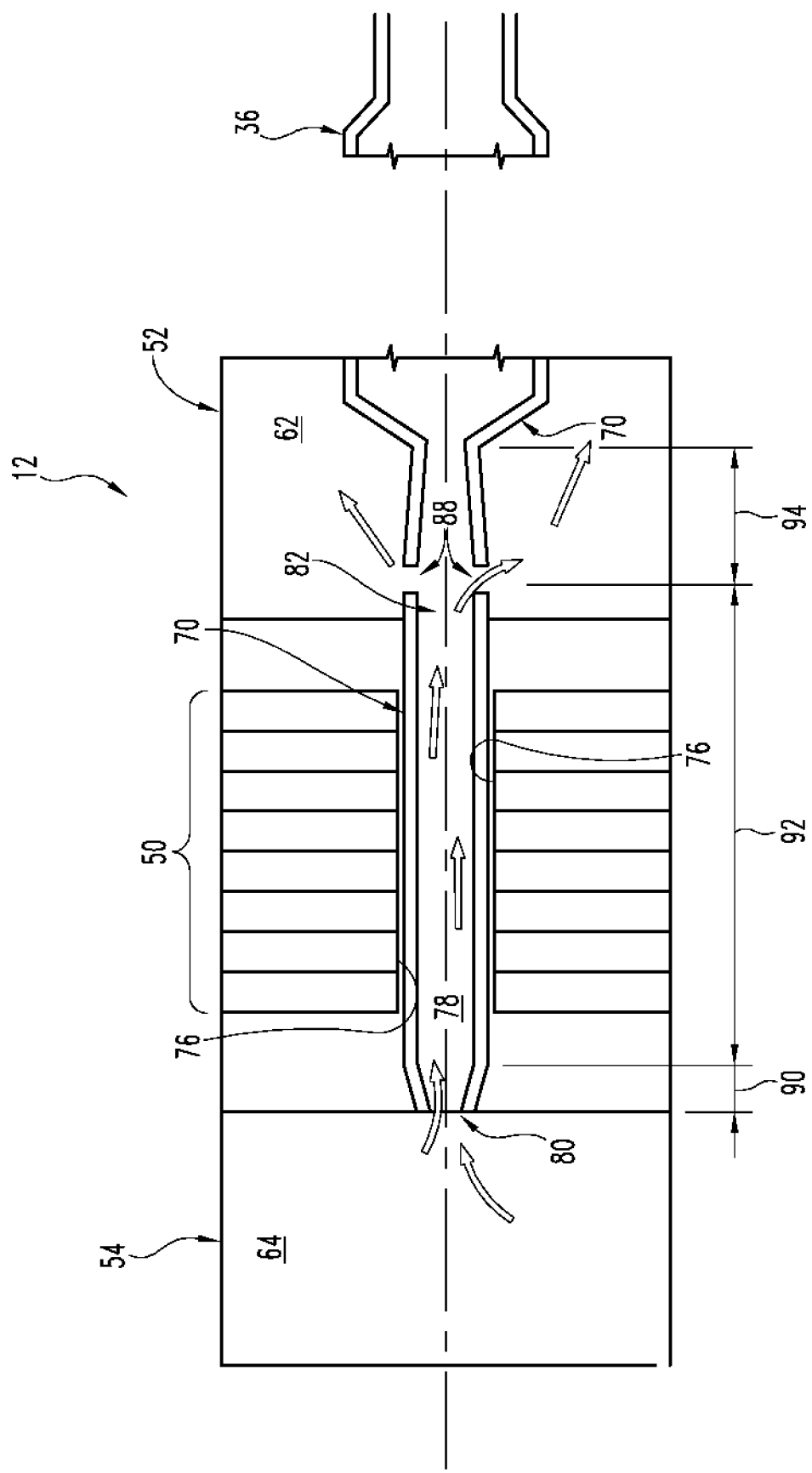
FIG. 2 shows a clutch according to an embodiment.

Turning to FIG. 2, the clutch 12 includes a multi disk clutch pack 50 and two separate working sections 52, 54, namely a driving side working section 52 and a driven side working section 54, at the aft and forward ends, that is axially opposite ends, of the clutch pack 50. In one form, the clutch pack 50 consists of a series of annular shape alternating clutch plates and clutch disks. As will be appreciated, the number of clutch plates and clutch disks will depend on for example the rotational power transmission demands of the driven component 14 on the gas turbine engine 10 among other factors. The clutch 12 can take on any suitable form for an application; in one form, the clutch 12 comprises a dry clutch. A not-shown hydraulic engagement mechanism can utilize hydraulic pressure to clamp the clutch plates and clutch disks to effect engagement of the clutch 12, or to release the clutch plates and clutch disks and thereby effect disengagement of the clutch 12. Other mechanisms, for example, magnetic, pneumatic, etc., are also contemplated.

The clutch 12 can include various components on both the driving side and the driven side of the clutch pack 50, for example, components that interconnect the driveshaft 36 and the driven shaft 40 at respective opposite ends of the clutch 12, hydraulic engagement components that facilitate selective engagement and disengagement of the clutch 12, accessory drives, an accessory gear box, actuator components, shaft bearings, gears and gear components, working fluid pumps, fluid flow control valves, etc.

The driving side working section 52 and the driven side working section 54 each serve to lubricate and/or cool various components of the clutch 12. In one form, the driving side working section 52 and the driven side working section 54 serve to cool, for example, the clutch pack 50 itself and/or the components on the driving side and/or the driven side of the clutch pack 50 that are exposed to heat radiated throughout the clutch 12 by the clutch pack 50. In another embodiment, each working section 52, 54, includes a working fluid system, represented generally by reference numerals 62, 64, respectively, in FIG. 2. In one form, the working fluid systems 62, 64, can utilize, for example, one or more working fluid pumps and/or control valves and/or fluid flow passages, etc. to route working fluid to the components. In one form, the working fluid pumps can comprise variable speed pumps and/or variable displacement pumps, for example. In one form, the working fluid serves a lubricating/cooling function. In one non-limiting form, the working fluid comprises oil, although other working fluid media are contemplated.

A clutch shaft 70 extends through central passage or axial openings 76 of the annular shape clutch plates and clutch disks of the clutch pack 50. In the FIG. 2 embodiment, the clutch shaft 70 or transmission shaft is shown coupled to the driveshaft 36. In another form, the clutch shaft 70 can be coupled to the shaft 40 of the driven component 14. In one form, the clutch shaft 70 and the driveshaft 36, or the clutch shaft 70 and the shaft 40 of the driven component 14, can be integrally formed as a single shaft.

The clutch shaft 70 defines a hollow 78 therethrough that extends axially from the driving side working section 52 to the driven side working section 54. The axial hollow 78 or fluid flow or fluid transfer passage 78 is in fluid communication with the working fluid system 62 of the driving side working section 52 and the working fluid system 64 of the driven side working section 54. Thus, working fluid can be routed through the hollow 78 between the two working fluid systems 62, 64.

Fluid flow passages or openings 88 can be provided in the clutch shaft 70 to route working fluid away from the hollow 78 and/or to the exterior of the clutch shaft 70. In the FIG. 2 embodiment, the radial openings 88 or radial flow passages project radially outward from the hollow 78 to the exterior of the clutch shaft 70. The hollow 78 and/or the fluid flow passages 88 of the clutch shaft 70 can be used for routing working fluid to cool the clutch 12. Thus, for example, working fluid can be routed from the components of the working fluid system 64 of the driven side working section 54 to an upstream entrance 80 of the hollow 78, and then through the hollow 78 and to the downstream end 82 of the hollow 78, and then through the openings 88 and to components of the working fluid system 62 of the driving side working section 52. In one form, the routing of the working fluid from the driven side working section 54 to the driving side working section 52 serves to remove, that is absorb, heat by convection from the clutch shaft 70. In another form, as the working fluid removes heat from the clutch shaft 70, the working fluid also removes heat generated by the clutch pack 50 that is thermally radiated to the clutch shaft 70.

The clutch shaft 70, the hollow 78 of the clutch shaft 70, and the fluid flow passages 88 of the clutch shaft 70, can have a size and/or shape based on, for example, the cooling requirements of the clutch 12 and/or the material properties of the clutch 12 and/or the material properties of the surrounding components, including the gas turbine engine 10 and gas turbine engine components. Further, the rate at which working fluid is routed through the hollow 78 can be based on similar factors, as well as the characteristics and material properties of the components of the working fluid systems 62, 64.

The working fluid can be conveyed, transferred, routed, etc. through the clutch shaft 70 by any suitable method. In one embodiment, working fluid can be routed through the hollow 78 by one or more working fluid pumps and/or control valves disposed for example at or near the upstream entrance 80 and at or near the openings 88 of the hollow 78. In another embodiment, the working fluid can be routed through the hollow 78 by centrifugal force caused by rotation of the clutch shaft 70. Thus, during rotation of the clutch shaft 70, for example during engagement of the clutch 12 by the gas turbine engine 10 and driveshaft 36, or during disengagement, centrifugal force can urge the working fluid along the inside diameter of the hollow 78 from the upstream entrance 80 to the openings 88 of the hollow 78. As the working fluid passes through the hollow 78, the working fluid can cool by convection the clutch shaft 70 and surrounding components such as the clutch pack 50 that radiate heat to the clutch shaft 70.

In the FIG. 2 embodiment, the clutch shaft 70 has three sections to facilitate passage of the working fluid through the clutch shaft 70: a diverging taper forward end 90, an intermediate portion 92, and a converging taper aft end 94. The hollow 78 in the diverging taper forward end 90 has a diverging taper and the hollow 78 in the converging taper aft end 90 has a converging taper. The openings 88 are disposed in the intermediate portion 92 axially adjacent to the upstream end (left end in FIG. 2) of the converging taper aft end 90, that is, axially adjacent to where the hollow 78 begins to taper or converge radially inwardly. Thus, by controlling the amount of working fluid that passes through the openings 88, working fluid that is at the intermediate portion 92 of the hollow 78 can be controlled to accumulate in the intermediate portion 92 axially between the diverging taper forward end 90 and the converging taper aft end 94; that is, the diverging taper forward end 90 and the converging taper aft end 94 serve a damming function at opposite ends of the intermediate portion 92 such that the clutch shaft 70 traps the working fluid at the intermediate portion 92. As the clutch shaft 70 rotates, urging working fluid along the inner diameter of the clutch shaft 70 under centrifugal force, the working fluid can accumulate along the inner diameter of the intermediate portion 92. The control of accumulation can depend on any number of factors, such as the non-limiting examples of the size, shape, quantity, distribution, arrangement, etc. of the openings 88 in the clutch shaft 70, the size, shape, and degree of taper of the tapers of the diverging taper forward end 90 and the converging taper aft end 94, the viscosity of the working fluid, the surface tension between the working fluid and the inner diameter of the clutch shaft 70, and/or environmental conditions such as temperature, pressure, etc., to name a few.

Figure 3:
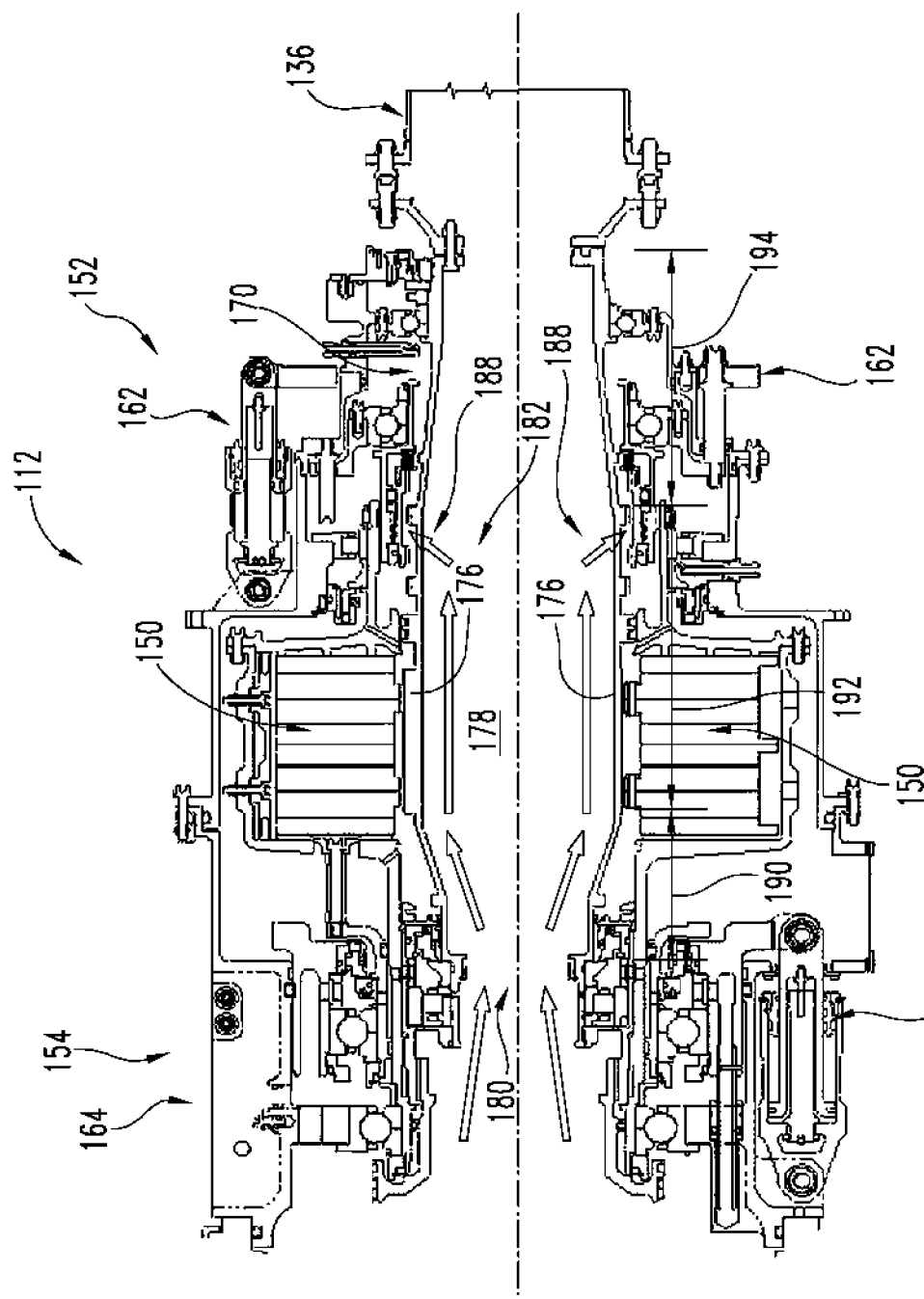
FIG. 3 shows a clutch according to an embodiment.

FIG. 3 shows a clutch 112 of the dry type according to an embodiment in which oil is used to cool friction surface devices of the dry type and/or associated structure in thermal communication with the friction surface devices. In the FIG. 3 embodiment, the components and features of the clutch 112, the driving side working section 152, and the driven side working section 154, that correspond to similar components and features of the clutch 12, the driving side working section 52, and the driven side working section 54, of the embodiment of FIGS. 1-2, are indicated by the same reference numerals, except that the FIG. 3 components and features have 100 added to the reference numerals. The configuration and manner of operation of the FIG. 3 components and features can be as they are respectively described above with respect to the embodiment of FIGS. 1-2, for example, and for purposes of clarity and brevity such description will not be repeated herein.

In the FIG. 3 embodiment, the working fluid system 164 and the working fluid system 162 comprise respective forward and aft oil-wetted regions 164, 162. The forward oil-wetted region 164 routes oil that serves as a working fluid to components in the driven side working section 154, and the aft oil-wetted region 162 routes oil as a working fluid to components in the driving side working section 152.

As shown in FIG. 3, the clutch shaft 170, which has the hollow 178 extending axially therethrough, comprises in the fwd-to-aft direction (left to right in FIG. 3) a diverging portion 190, a central portion 192, and a converging portion 194. The diverging portion 190 of the clutch shaft 170 is disposed substantially within the forward oil-wetted region 164 with its upstream narrow end defining the opening 180 of the clutch shaft 170, and its downstream wide end being joined to the upstream end of the central portion 192. The central portion 192 of the clutch shaft 170 has a substantially cylindrical shape and extends through the central passage or axial openings 176 of the clutch plates and clutch disks of the clutch pack 150, and partially into the aft oil-wetted region 162. The converging portion 194 of the clutch shaft 170 is disposed substantially within the aft oil-wetted region 162 with its upstream wide end being joined to the downstream end of the central portion 192, and its downstream end being connected to the driveshaft 136 of the gas turbine engine 10 via a coupling member. The central portion 192 of the clutch shaft 170 can have fluid flow passages or openings 188 projecting radially through the wall of the central portion 192. In the FIG. 3 embodiment, the openings 188 are located between the downstream end of the clutch pack 150 and the upstream end of the converging portion 194.

In an embodiment, oil can be routed from the forward oil-wetted region 164, through the upstream opening 180, along the inner diameter of the diverging portion 190 and the central portion 192 of the clutch shaft 170, and scavenged into the aft oil-wetted region 162 via the fluid flow openings 188. In one form, the oil can be urged along the inner diameter of the clutch shaft 170 under a centrifugal force caused by rotation of the clutch shaft 170. Likewise, the centrifugal force can be used to expel the oil through the fluid flow openings 188 toward the outer circumference side of the clutch shaft 170. In one form, the oil is accumulated at the central portion 192 based on the size of the tapers of the diverging portion 190 and converging portion 194 and the size and distribution of the fluid flow passages 188. In another form, the oil is routed through the clutch shaft 170 by for example one or more working fluid pumps and/or control valves located for example in one or both of the oil-wetted regions 162, 164. In another form, the oil is routed through the clutch shaft 170 by a combination of damming, friction, centrifugal force, working fluid pump(s), and/or control valve(s).

In the FIG. 3 embodiment, the routing of oil through the clutch shaft 170 can serve to remove heat from the clutch shaft 170 as well as heat from the heat source, that is the clutch pack 150. The amount of heat that can be removed, and the rate at which heat can be removed, can depend on such factors as the type of oil, the rate at which the oil is routed through the clutch shaft 170, the size, shape, and material properties of the clutch shaft 170, clutch pack 150, and surrounding components, to name a few.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A gas turbine engine power transmission assembly comprising
a stack of axially aligned annular shape power transmission disks capable of selectively transmitting power from a drive shaft of a gas turbine engine to a driven aircraft component, the annular shape power transmission disks together defining a dry clutch assembly having an axially extending central passage;
a transmission shaft that extends through the axially extending central passage of the annular shape power transmission disks and that defines an axially extending fluid transfer passage that extends through the transmission shaft at least the length of the axially extending central passage, the transmission shaft comprising a central shaft portion that extends at least the length of the axially extending central passage, and a diverging shaft portion upstream of the central shaft portion in which a wide end of the diverging shaft portion is joined to the central shaft portion; and
means for transferring a heat conducting fluid through the axially extending fluid transfer passage of the transmission shaft,
wherein the axially aligned annular shape power transmission disks are disposed between the gas turbine engine and the driven aircraft component, and wherein the means for transferring a heat conducting fluid comprises a liquid fluid transfer mechanism configured to transfer a heat convecting liquid fluid through the fluid transfer passage of the transmission shaft.

2. The gas turbine engine power transmission assembly of claim 1 in which the liquid fluid transfer mechanism comprises the transmission shaft which transfers the heat convecting fluid through the fluid transfer passage by centrifugal force.

3. The gas turbine engine power transmission assembly of claim 1 in which the transmission shaft comprises a central shaft portion that extends at least the length of the axially extending central passage, and a converging shaft portion downstream of the central shaft portion in which a wide end of the converging shaft portion is joined to the central shaft portion.

4. The gas turbine engine power transmission assembly of claim 3 in which the transmission shaft has one or more radial flow passages extending from the axially extending fluid transfer passage to a location radially external to the transmission shaft.

5. The gas turbine engine power transmission assembly of claim 4 in which the radial flow passages are positioned axially in the transmission shaft in at least one of the wall of the central shaft portion and the wall of the converging shaft portion.

6. The gas turbine engine power transmission assembly of claim 5 in which the central shaft portion has an accumulation section that is configured to accumulate heat convecting fluid during rotation of the transmission shaft based on one or more of the size and arrangement of the radial flow passages.

7. The gas turbine engine power transmission assembly of claim 5 in which the central shaft portion has an accumulation section that is configured to accumulate heat convecting fluid during rotation of the transmission shaft based on the degree of taper of the converging shaft portion.

8. A gas turbine engine power transmission assembly comprising
a stack of axially aligned annular shape power transmission disks capable of selectively transmitting power from a drive shaft of a gas turbine engine to a driven aircraft component, the annular shape power transmission disks together defining a dry clutch assembly having an axially extending central passage;
a transmission shaft that extends through the axially extending central passage of the annular shape power transmission disks and that defines an axially extending fluid transfer passage that extends through the transmission shaft at least the length of the axially extending central passage, the transmission shaft includes a central shaft portion that extends at least the length of the axially extending central passage and defines at least a portion of the fluid transfer passage, and a converging shaft portion downstream of the central shaft portion in which a wide end of the converging shaft portion is joined to the central shaft portion; and
means for transferring a heat conducting fluid through the axially extending fluid transfer passage of the transmission shaft.

9. The gas turbine engine power transmission assembly of claim 8 in which the transmission shaft has one or more radial flow passages extending from the axially extending fluid transfer passage to a location radially external to the transmission shaft.

10. The gas turbine engine power transmission assembly of claim 9 in which the radial flow passages are positioned axially in the transmission shaft in at least one of the wall of the central shaft portion and the wall of the converging shaft portion.

11. The gas turbine engine power transmission assembly of claim 10 in which the central shaft portion has an accumulation section that is configured to accumulate heat convecting fluid during rotation of the transmission shaft based on one or more of the size and arrangement of the radial flow passages.

12. The gas turbine engine power transmission assembly of claim 8 in which the central shaft portion has an accumulation section that is configured to accumulate heat convecting fluid during rotation of the transmission shaft based on the degree of taper of the converging shaft portion.

* * * * *